(12) United States Patent
Soga et al.

(10) Patent No.: US 7,196,121 B2
(45) Date of Patent: *Mar. 27, 2007

(54) INKJET RECORDING INK, SOLVENT FOR USE IN SAID INK AND CARTRIDGE AND RECORDING DEVICE HAVING SAID INK

(75) Inventors: Mamoru Soga, Osaka (JP); Hidekazu Arase, Fukuoka (JP); Hiroyuki Matsuo, Osaka (JP); Masaichiro Tatekawa, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 215 days.

This patent is subject to a terminal disclaimer.

(21) Appl. No.: 10/468,954

(22) PCT Filed: Mar. 8, 2002

(86) PCT No.: PCT/JP02/02221

§ 371 (c)(1),
(2), (4) Date: Aug. 22, 2003

(87) PCT Pub. No.: WO02/072720

PCT Pub. Date: Sep. 19, 2002

(65) Prior Publication Data

US 2004/0082685 A1    Apr. 29, 2004

(30) Foreign Application Priority Data

| Mar. 8, 2001 | (JP) | 2001-064375 |
| Mar. 8, 2001 | (JP) | 2001-064470 |
| Sep. 25, 2001 | (JP) | 2001-290923 |
| Sep. 25, 2001 | (JP) | 2001-290993 |

(51) Int. Cl.
*C09D 11/10* (2006.01)
*C08K 5/54* (2006.01)
*C08L 83/04* (2006.01)
*C08G 77/22* (2006.01)
*C08G 77/00* (2006.01)

(52) U.S. Cl. .............. 523/160; 524/261; 524/588; 528/10

(58) Field of Classification Search ........ 523/160, 523/161; 106/31.27, 31.6; 524/261, 262, 524/588; 528/10, 38
See application file for complete search history.

(56) References Cited

U.S. PATENT DOCUMENTS

| 4,045,397 A | * | 8/1977 | Parkinson | 524/262 |
| 5,648,405 A | * | 7/1997 | Ma et al. | 523/160 |
| 6,419,732 B1 | * | 7/2002 | Matsumura et al. | 106/31.75 |
| 6,585,362 B2 | * | 7/2003 | Blease et al. | 347/92 |
| 6,685,770 B2 | * | 2/2004 | Adachi et al. | 106/31.58 |
| 6,809,128 B2 | | 10/2004 | Ohta et al. | |
| 6,988,794 B2 | * | 1/2006 | Arase et al. | 347/100 |
| 2002/0096085 A1 | * | 7/2002 | Gotoh et al. | 106/31.86 |

FOREIGN PATENT DOCUMENTS

| EP | 488252 A2 | 6/1992 |
| EP | 856566 A1 | 8/1998 |
| EP | 940456 A1 | 9/1999 |
| EP | 1010739 A1 | 6/2000 |
| JP | 10212439 A | 8/1998 |
| JP | 11293167 A | 10/1999 |
| JP | 11315231 A | 11/1999 |

OTHER PUBLICATIONS

International Search Report for International Application No. PCT/JP02/02221 completed May 29, 2002; ISA/JPO.

* cited by examiner

*Primary Examiner*—Callie Shosho
(74) *Attorney, Agent, or Firm*—Harness, Dickey & Pierce, P.L.C.

(57) ABSTRACT

In ink containing a colorant, a humectant, a penetrant, water, and a water-soluble substance that is condensation-polymerized in the absence of the water (e.g., hydrolyzable silane compound), the surface tension of the ink at 25° C. before the water-soluble substance is condensation-polymerized is set to 20–50 mN/m, or the ink further contains a fluoroalkyl monoalcohol whose boiling point is lower than 100° C.

5 Claims, 3 Drawing Sheets

INKJET RECORDING INK, SOLVENT FOR USE IN SAID INK AND CARTRIDGE AND RECORDING DEVICE HAVING SAID INK

TECHNICAL FIELD

The present invention falls within the technical field which relates to ink suitable for inkjet recording, a solvent used for the ink, and a cartridge and recording apparatus including the ink.

BACKGROUND ART

Conventionally, ink containing a colorant, such as a dye, a pigment, or the like, a humectant, a penetrant, and water has been well known as ink used for inkjet recording. However, in the case where an image is formed with the ink containing the colorant on a recording medium, such as recording paper, or the like, the water-resistivity of the image is a matter of concern. Especially when an image is recorded with ink containing a dye on plain paper, the water-resistivity of the image is very poor. (The "plain paper" herein refers to paper which is one of various types of commercially-available paper, which is especially used for an electrophotographic copying machine, and which is produced without an intention to have an optimum structure, composition, properties, or the like, for inkjet recording.)

As disclosed in Japanese Unexamined Patent Publication No. 10-212439, Japanese Unexamined Patent Publication No. 11-293167, and Japanese Unexamined Patent Publication No. 11-315231, adding a hydrolyzable silane compound (organic silicon compound) to ink in order to improve the water-resistivity of an image formed on a recording medium has been conventionally proposed. When a drop of the ink is adhered onto a recording medium, and a solvent contained in the ink drop, such as water, or the like, evaporates or permeates into the recording medium, the silane compound is condensation-polymerized, and this condensation-polymerized silane compound encloses a colorant. Thus, even when the image formed on the recording medium is exposed to water, the colorant does not exude into the water. That is, the water-resistivity of the image is improved.

However, in the case where such ink containing a hydrolyzable silane compound is used as it is, when an ink drop adhered onto a recording medium, the speed of evaporation of a solvent, such as water, from the ink drop and the speed of permeation of the solvent into the recording medium are relatively slow, and the condensation-polymerization of the silane compound is not quickly performed. As a result, enclosure of the colorant by the silane compound is insufficient. Especially when an image formed on the recording medium is exposed to water immediately after the formation thereof, a colorant which is not enclosed by the silane compound exudes into the water. In such a case, sufficient improvement of water-resistivity cannot be achieved.

The present invention was conceived in view of the above problems. An objective of the present invention is to surely improve the water-resistivity of an image formed with ink containing a water-soluble substance that is condensation-polymerized in the absence of water, such as a hydrolyzable silane compound. Especially, an objective of the present invention is to improve the water-resistivity of the image immediately after the formation thereof.

DISCLOSURE OF INVENTION

According to the present invention, for the purpose of achieving the above objective, the surface tension of ink or solvent (containing a humectant, a penetrant and water) is set to a relatively low value, or a fluoroalkyl monoalcohol, whose boiling point is lower than 100° C., is added to the ink.

Specifically, the first invention is directed to ink for inkjet recording which contains a solvent including a humectant, a penetrant, and water, a colorant, and a water-soluble substance that is condensation-polymerized in the absence of the water, wherein the surface tension of the ink at 25° C. before the water-soluble substance is condensation-polymerized is set to 20–50 mN/m (20–50 dyn/cm).

In the case where the surface tension of the ink is set to a relatively low value of 50 mN/m or smaller, when an ink drop is adhered onto a recording medium (e.g., paper), a solvent contained in the ink drop, such as water, or the like, readily permeates into the recording medium. As a result, condensation-polymerization of the water-soluble substance is quickly performed so that the water-soluble substance quickly and surely encloses the colorant (dye, pigment, or the like). Thus, even if an image formed with this ink on a recording medium is exposed to water immediately after the formation thereof, the colorant of the ink hardly exudes into the water because it is enclosed by the condensation-polymerized water-soluble substance. Therefore, the water-resistivity of the image is improved. It should be noted that the surface tension of the ink can readily be set by adjusting the content of the penetrant.

The surface tension of the ink is preferably set to be as low as possible in view of quick permeation of the solvent into the recording medium. However, if the surface tension of the ink is smaller than 20 mN/m, it is difficult to make the ink into the form of a droplet to be ejected, and such ink is thus undesirable for inkjet recording. Therefore, the surface tension of the ink is set to 20 mN/m or greater.

According to the second invention, in the first invention, the surface tension of the ink at 25° C. before the water-soluble substance is condensation-polymerized is set to 30–40 mN/m (30–40 dyn/cm).

In the case of employing such a setting, a relatively thin film (e.g., 8 μm or smaller) is preferably used as a piezoelectric element of a piezoelectric actuator for ejecting an ink drop. Consider a case where an inkjet head is formed by a pressure chamber which contains ink, a nozzle which communicates with the pressure chamber, and a piezoelectric actuator which flexibly deforms to increase/decrease the pressure inside the ink chamber. In order to eject an ink drop (especially, a small ink drop of 3 pl or smaller), the piezoelectric actuator is first flexibly deformed such that the pressure inside the pressure chamber is increased, whereby ink is extruded from the nozzle. Thereafter, the piezoelectric actuator is quickly deformed (in a pull-back direction opposite to the ink extrusion direction) such that the pressure inside the pressure chamber is decreased, whereby the ink extruded out of the nozzle is separated from the ink remaining in the pressure chamber and released as an ink drop. If the piezoelectric element of the piezoelectric actuator is formed by a thick film having a thickness of, e.g., 10 μm or greater, force caused when the piezoelectric actuator undergoes the pull-back deformation is relatively large. Therefore, the extruded ink can be separated even when the surface tension of the ink is relatively low. As a result, an ink drop is formed and ejected from the nozzle. If the thickness of the piezoelectric element is small, force caused when the piezoelectric actuator undergoes the pull-back deformation is small. Therefore, the extruded ink cannot be separated when the surface tension of the ink is low. As a result, an ink drop cannot be formed. However, by setting the surface tension of the ink to 30 mN/m or greater as in this invention, the ink can be separated even when the piezoelectric element is formed by a thin film, and thus, an ink drop is surely formed and released from the nozzle.

In the case where the piezoelectric element is formed by a thin film, the driving frequency of the piezoelectric actuator can be increased by setting the surface tension of the ink to 40 mN/m or smaller. When the piezoelectric actuator undergoes the pull-back deformation, the ink is sucked from an ink cartridge which communicates with the pressure chamber so that the pressure chamber is filled with the ink. However, when the piezoelectric element is formed by a thin film, force caused when the piezoelectric actuator undergoes the pull-back deformation is small as described above, and thus, suction of the ink into the pressure chamber is not smoothly performed when the surface tension of the ink is too high. As a result, the time interval between a time of ejecting an ink drop and a time of ejecting a next ink drop becomes long, and accordingly, the driving frequency of the piezoelectric actuator decreases. However, in the case where the surface tension of the ink is set to 40 mN/m or smaller, suction of the ink into the pressure chamber is smoothly performed even when the piezoelectric element is formed by a thin film. As a result, the piezoelectric actuator is driven at a high frequency of 20 kHz or higher to eject ink drops. Further, as described above, when the ink drop is adhered onto a recording medium, the solvent of the ink quickly permeates into the recording medium. Accordingly, the colorant is quickly and surely enclosed due to condensation-polymerization of the water-soluble substance, and as a result, high water-resistivity is obtained.

According to the third invention, in the first invention, the viscosity of the ink at 25° C. before the water-soluble substance is condensation-polymerized is set to 2–10 cP.

By setting the viscosity of the ink to a relatively low value of 10 cP or smaller, the solvent permeates into the recording medium more quickly. As a result, the water-resistivity of an image immediately after the formation thereof is more improved. The viscosity of the ink is preferably set to be as low as possible in view of quick permeation of the solvent into the recording medium. However, considering that the viscosity of water is about 1 cP, the lower limit of the viscosity of the ink containing the colorant, the humectant, the penetrant and the water-soluble substance is 2 cP.

According to the fourth invention, in the first invention, the content of the penetrant is set to 1–50% by mass with respect to the total amount of the ink.

If the content of the penetrant is smaller than 1%, it is difficult to set the surface tension of the ink to 50 mN/m or smaller. If the content of the penetrant is greater than 50%, the solubility of the colorant and the silane compound to the solvent deteriorates. Thus, the content of the penetrant is preferably set to 1–50%.

According to the fifth invention, in the first invention, the water-soluble substance is a hydrolyzable silane compound.

That is, the silane compound is very preferable in view of improvement of water-resistivity and enables efficient achievement of the effects of the first invention.

The sixth invention is directed to ink for inkjet recording, which contains a colorant, a humectant, a penetrant, water, and a water-soluble substance that is condensation-polymerized in the absence of the water, wherein the ink further contains a fluoroalkyl monoalcohol whose boiling point is lower than 100° C. (This temperature is a value under standard conditions. Hereinafter, this always applies to the boiling point.)

In this invention, molecules of water are diffused at a level which corresponds to the content of the fluoroalkyl monoalcohol. Thus, when an ink drop is adhered onto a recording medium, evaporation of water contained in the ink drop and permeation of the water into the recording medium are quickly performed. Further, since the surface tension of the ink is decreased due to the contained fluoroalkyl monoalcohol, permeation of water, fluoroalkyl monoalcohol, or the like, into the recording medium is more readily performed. Furthermore, since the boiling point of the fluoroalkyl monoalcohol is lower than that of water, the fluoroalkyl monoalcohol evaporates faster than water and evaporates even after it permeates into the recording medium. Thus, the fluoroalkyl monoalcohol does not inhibit the condensation-polymerization of the water-soluble substance. As a result, after an ink drop is adhered onto the recording medium, the water-soluble substance is quickly condensation-polymerized to surely encloses the colorant. Therefore, as in the first invention, the water-resistivity of an image can be surely improved.

According to the seventh invention, in the sixth invention, the water-soluble substance is a hydrolyzable silane compound. With this feature, the effects of the sixth invention are efficiently achieved.

According to the eighth invention, in the sixth invention, the content of the fluoroalkyl monoalcohol is set to 5–50% by mass with respect to the total amount of the ink.

If the content of the fluoroalkyl monoalcohol is smaller than 5%, an effect of allowing water contained in an ink drop adhered onto a recording medium to quickly evaporate and an effect of allowing the water contained in the ink drop to quickly permeate into the recording medium cannot be sufficiently obtained. On the other hand, if the content of the fluoroalkyl monoalcohol is greater than 50%, the ink dries more readily even when a humectant is contained in the ink, and as a result, the nozzles of the inkjet head of the recording apparatus, or the like, are clogged. Thus, it is preferable to set the content of the fluoroalkyl monoalcohol to 5–50%.

The ninth invention is directed to a solvent which contains a humectant, a penetrant, and water. In the solvent, at least a colorant and a water-soluble substance that is condensation-polymerized in the absence of the water are dissolved to produce ink for inkjet recording. The surface tension of the solvent at 25° C. is set to 20–56 mN/m.

In the case where this solvent is used to produce ink, the value of the surface tension of the ink can be set within a range of 20–50 mN/m. Thus, the ink for inkjet recording according to the first invention can readily be produced.

The tenth invention is directed to a cartridge including ink for inkjet recording. The ink contains a solvent which includes a humectant, a penetrant, and water, a colorant, and a water-soluble substance that is condensation-polymerized in the absence of the water. In this invention, the surface tension of the ink at 25° C. before the water-soluble substance is condensation-polymerized is set to 20–50 mN/m.

This invention achieves the same effects as those of the first invention.

The eleventh invention is directed to a cartridge including ink for inkjet recording. The ink contains a colorant, a humectant, a penetrant, water, and a water-soluble substance that is condensation-polymerized in the absence of the water. The ink further contains a fluoroalkyl monoalcohol whose boiling point is lower than 10020 C.

With this feature, the same effects as those of the sixth invention are achieved.

The twelfth invention is directed to a recording apparatus including ink for inkjet recording. The ink contains a solvent which includes a humectant, a penetrant, and water, a colorant, and a water-soluble substance that is condensation-polymerized in the absence of the water. The recording apparatus ejects the ink toward a recording medium for recording. In this invention, the surface tension of the ink at 25° C. before the water-soluble substance is condensation-polymerized is set to 20–50 mN/m.

This invention achieves the same effects as those of the first invention.

The thirteenth invention is directed to a recording apparatus including ink for inkjet recording. The ink contains a colorant, a humectant, a penetrant, water, and a water-soluble substance that is condensation-polymerized in the absence of the water. The recording apparatus ejects the ink toward a recording medium for recording. The ink further contains a fluoroalkyl monoalcohol whose boiling point is lower than 100° C.

With this feature, the same effects as those of the sixth invention are achieved.

BEST MODE FOR CARRYING OUT THE INVENTION

Figure 1:
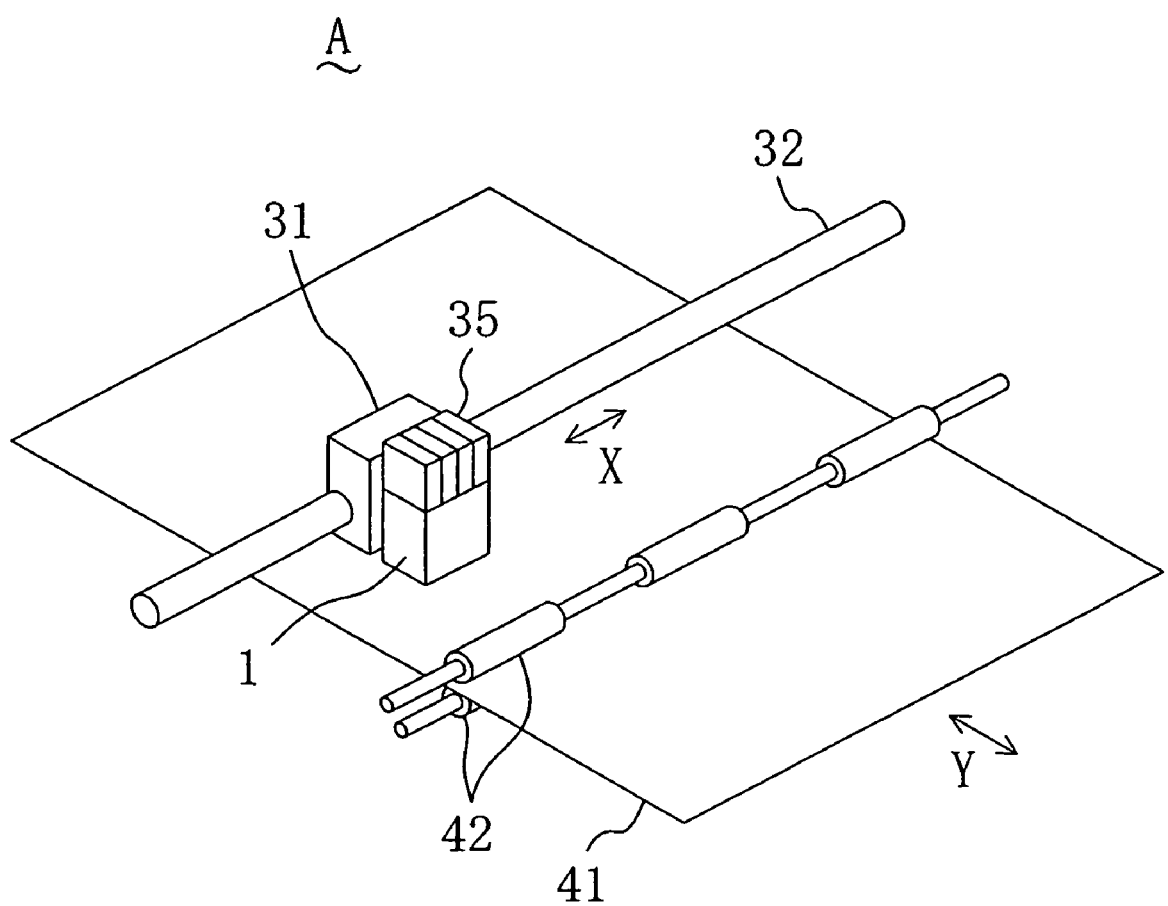
FIG. 1 is a general perspective view showing an inkjet-type recording apparatus including ink for inkjet recording according to an embodiment of the present invention.

FIG. 1 generally shows an inkjet-type recording apparatus A including ink for inkjet recording according to an embodiment of the present invention. The recording apparatus A has an inkjet head 1. An ink cartridge 35 including ink is attached onto the upper surface of the inkjet head 1. The inkjet head 1 ejects the ink onto recording paper 41 employed as a recording medium in a manner described later. The inkjet head 1 is fixedly supported by a carriage 31. The carriage 31 is provided with a carriage motor (not shown). The inkjet head 1 and the carriage 31 are reciprocated along the primary scanning direction (X direction in FIGS. 1 and 2) by the carriage motor while being guided by a carriage shaft 32 which extends along the primary scanning direction. The carriage 31, the carriage shaft 32 and the carriage motor constitute relative movement means for relatively moving the inkjet head 1 and the recording paper 41 along the primary scanning direction.

The ink cartridge 35 is a container which contains the ink. The ink cartridge 35 is structured so as to be detachable from the inkjet head 1. When the ink in the container is exhausted, the ink cartridge 35 can be replaced by a new one.

The recording paper 41 is sandwiched by two transfer rollers 42 which are rotated by a transfer motor (not shown). Under the inkjet head 1, the recording paper 41 is transferred by the transfer motor and transfer rollers 42 along the secondary scanning direction (Y direction in FIGS. 1 and 2) which is perpendicular to the primary scanning direction. The transfer motor and transfer rollers 42 constitute relative movement means for relatively moving the inkjet head 1 and the recording paper 41 along the secondary scanning direction.

Figure 2:
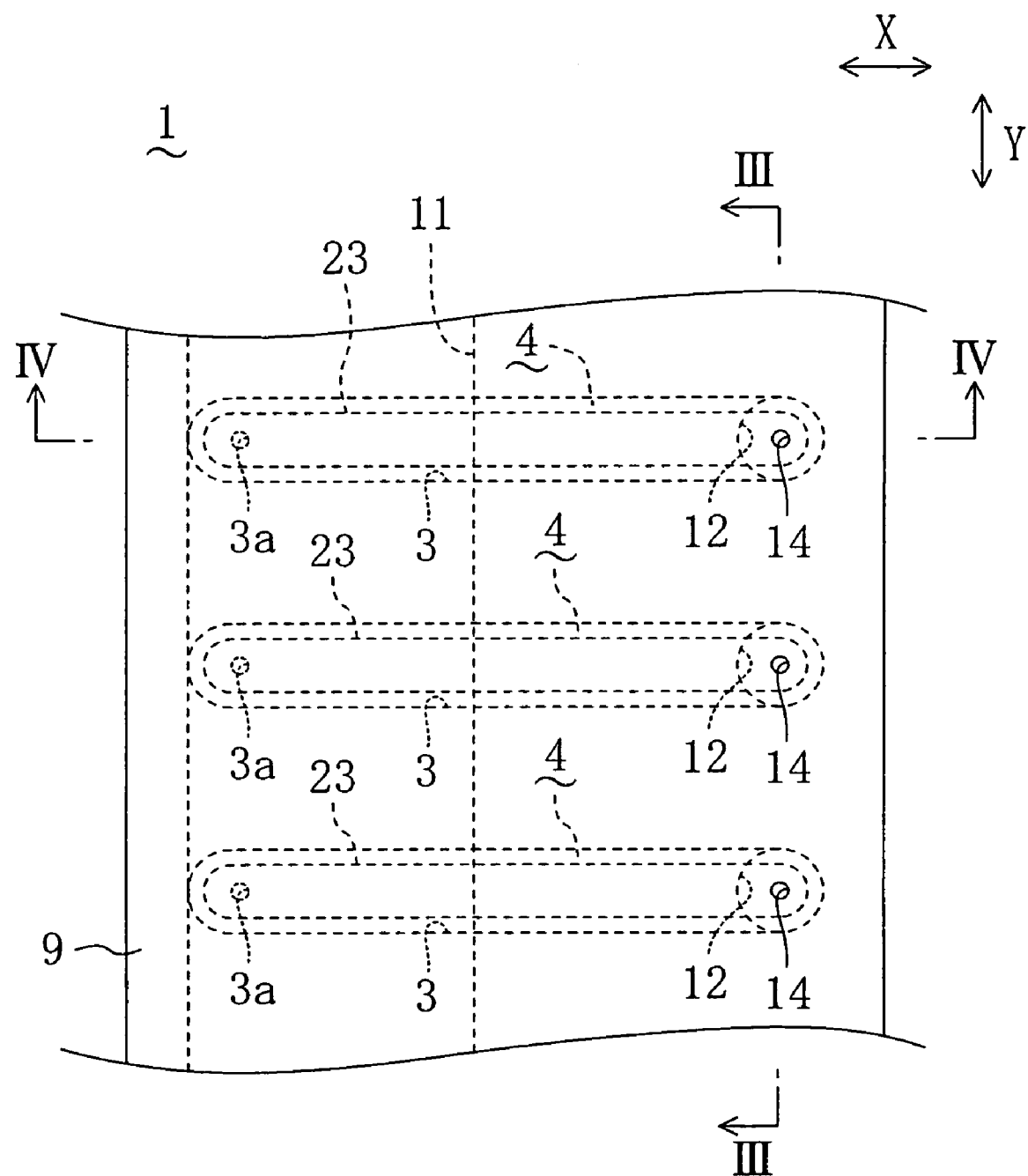
FIG. 2 shows a portion of a bottom surface of an inkjet head of the inkjet-type recording apparatus.
Figure 3:
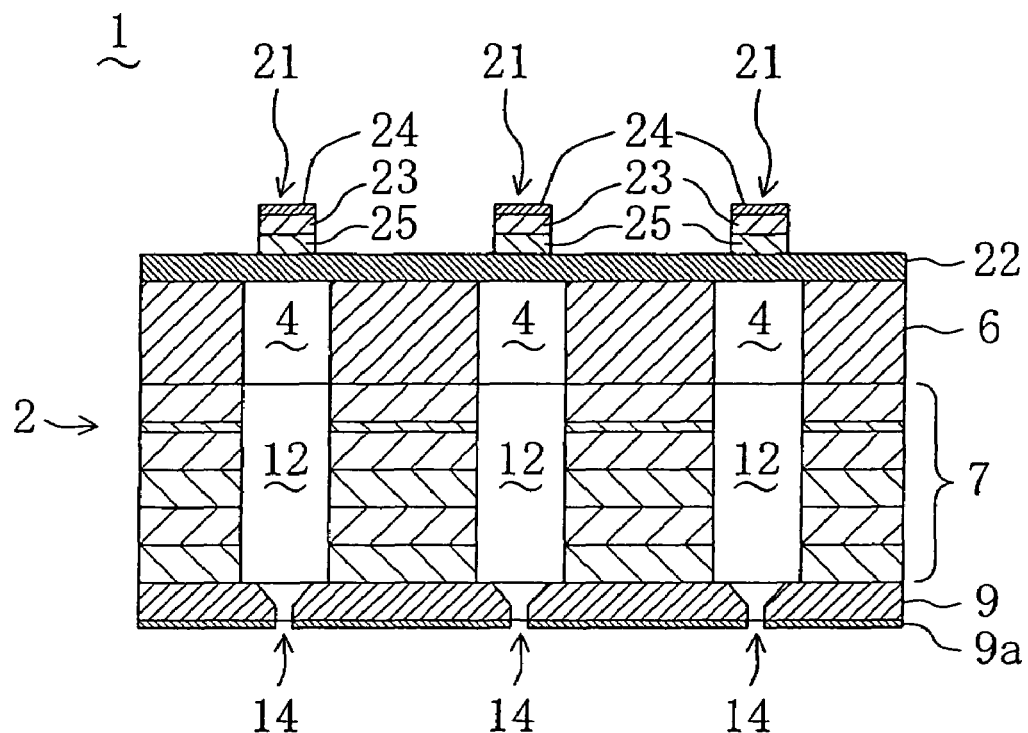
FIG. 3 is a cross-sectional view taken along line III—III of FIG. 2.
Figure 4:
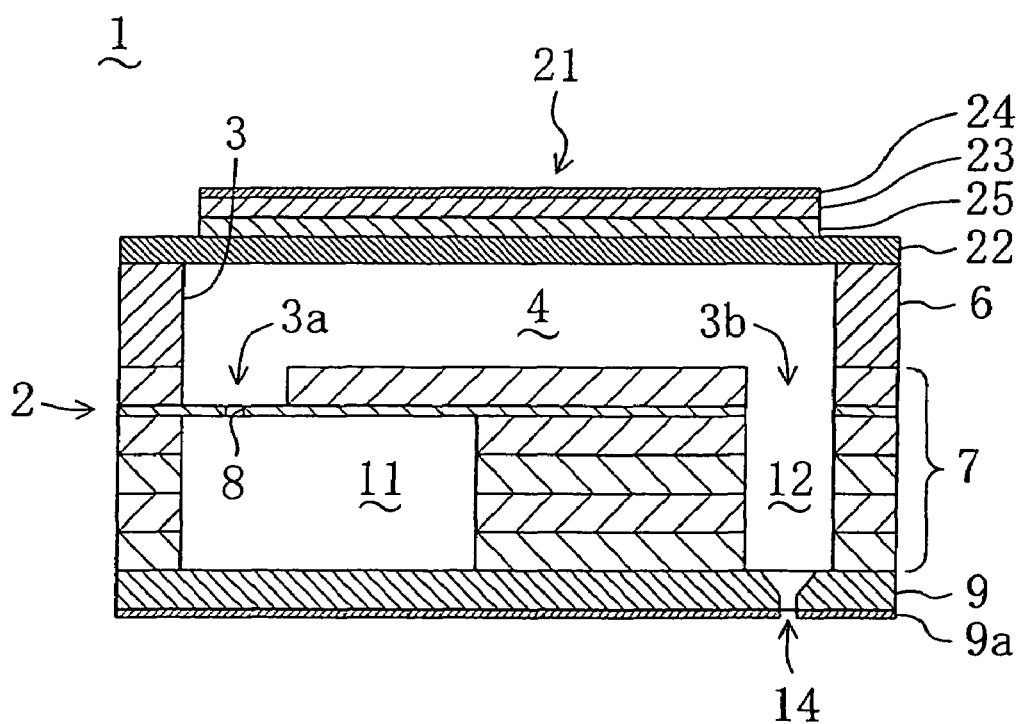
FIG. 4 is a cross-sectional view taken along line IV—IV of FIG. 2.

Referring to FIGS. 2 through 4, the inkjet head 1 includes a head body 2. The head body 2 includes a plurality of concaved portions 3 for pressure chambers. Each of the concaved portions 3 has a supply hole 3a for supplying ink and an ejection hole 3b for ejecting the ink. The concaved portions 3 of the head body 2 are opened in the upper surface of the head body 2 such that the openings extend along the primary scanning direction, and arranged along the secondary scanning direction with generally-equal intervals therebetween. The length of the opening of each concaved portion 3 is set to about 1250 μm, and the width thereof is set to about 130 μm. Opposite ends of the opening of each concaved portion 3 have a generally-semicircular shape.

A side wall of each concaved portion 3 of the head body 2 is formed by a pressure chamber member 6 made of photosensitive glass having a thickness of about 200 μm. A bottom wall of each concaved portion 3 is formed by an ink passage member 7 which is adhesively fixed onto the lower surface of the pressure chamber member 6. The ink passage member 7 is a laminate of six thin plates of stainless steel.

The ink passage member 7 has a plurality of orifices 8, one ink supply passage 11, and a plurality of ink ejection passages 12. Each of the orifices 8 is connected to the supply hole 3a of a corresponding one of the concaved portions 3. The ink supply passage 11 is connected to the orifices 8 and extends along the secondary scanning direction. Each of the ink ejection passages 12 is connected to the ejection hole 3b of a corresponding one of the concaved portions 3.

Each orifice 8 is formed in the second thin plate of stainless steel from the top of the ink passage member 7. The thickness of the second thin plate is smaller than those of the other thin plates. The diameter of the orifice 8 is set to about 38 μm. The ink supply passage 11 is connected to the ink cartridge 35, such that the ink is supplied from the ink cartridge 35 into the ink supply passage 11.

A nozzle plate 9 made of stainless steel is adhesively fixed onto the lower surface of the ink passage member 7. The nozzle plate 9 has a plurality of nozzles 14 for ejecting ink drops toward the recording paper 41. The lower surface of the nozzle plate 9 is covered with a water-repulsive film 9a. The nozzles 14 are connected to the ink ejection passages 12 so as to have a communication with the ejection holes 3b of the concaved portions 3 through the ink ejection passages 12. The nozzles 14 are aligned in a row on the lower surface of the inkjet head 1 along the secondary scanning direction. Each nozzle 14 includes a tapered portion, where the nozzle diameter gradually decreases along a direction toward a nozzle tip side, and a straight portion provided at the nozzle tip side of the tapered portion. The nozzle diameter of the straight portion is set to about 20 μm.

Piezoelectric actuators 21 are provided above the concaved portions 3 of the head body 2. The piezoelectric actuators 21 have a diaphragm 22 made of Cr. The diaphragm 22 is adhesively fixed onto the upper surface of the head body 2 so as to cover the concaved portions 3 of the head body 2. The diaphragm 22 and the concaved portions 3 form pressure chambers 4. The diaphragm 22 is a single element which is commonly used for all of the actuators 21. The diaphragm 22 also functions as a common electrode which is commonly used for all of piezoelectric elements 23 (described later).

Each piezoelectric actuator 21 has a piezoelectric element 23 made of lead zirconate titanate (PZT) and an individual electrode 24 made of Pt. On a surface of the diaphragm 22 which is opposite to the pressure chamber 4 (i.e., the upper surface of the diaphragm 22), the piezoelectric element 23 is provided at a portion of the surface which corresponds to the pressure chamber 4 (a portion above the opening of the concaved portion 3) with an intermediate layer 25 made of Cu interposed between the diaphragm 22 and the piezoelectric element 23. The individual electrode 24 is provided on a surface of the piezoelectric element 23 which is opposite to the diaphragm 22 (i.e., the upper surface of the piezoelectric element 23). The individual electrode 24 functions together with the diaphragm 22 to apply a voltage (driving voltage) to each piezoelectric element 23.

All of the diaphragm 22, the piezoelectric elements 23, the individual electrodes 24 and the intermediate layers 25 are formed of thin films. The thickness of the diaphragm 22 is set to about 6 µm. The thickness of each piezoelectric element 23 is set to 8 µm or smaller (e.g., about 3 µm). The thickness of each individual electrode 24 is set to about 0.2 µm. The thickness of each intermediate layer 25 is set to about 3 µm.

Each piezoelectric actuator 21 deforms a portion of the diaphragm 22 which corresponds to the pressure chamber 4 by applying a driving voltage to the piezoelectric element 23 through the diaphragm 22 or the intermediate layer 25 and the individual electrode 24, whereby the ink in the pressure chamber 4 is ejected from the ejection hole 3b or the nozzle 14. That is, when a pulse-shaped voltage is applied between the diaphragm 22 and the individual electrode 24, the piezoelectric element 23 shrinks along the width direction of the piezoelectric element 23, which is perpendicular to the thickness direction thereof, in response to a rising edge of the pulse voltage because of a piezoelectric effect. On the other hand, the diaphragm 22, the individual electrode 24 and the intermediate layer 25 do not shrink. As a result, a portion of the diaphragm 22 which corresponds to the pressure chamber 4 is flexibly deformed into the shape of a convex toward the pressure chamber 4 because of a so-called bimetal effect. This flexible deformation produces a pressure in the pressure chamber 4, and because of this pressure, the ink in the pressure chamber 4 is extruded out of the nozzle 14 through the ejection hole 3b and the ink ejection passages 12. Then, the piezoelectric element 23 expands in response to a falling edge of the pulse voltage so that the portion of the diaphragm 22 which corresponds to the pressure chamber 4 recovers its original shape. At this time, the ink extruded out of the nozzle 14 is separated from the ink remaining in the ink ejection passage 12, whereby the separated ink is released as an ink drop of, e.g., 3 pl, toward the recording paper 41. The released ink drop adheres onto the recording paper 41 in the form of a dot. On the other hand, when the diaphragm 22 flexibly deformed in the shape of a convex recovers its original shape, the pressure chamber 4 is charged with the ink which is supplied from the ink cartridge 35 through the ink supply passage 11 and the supply hole 3a. The pulse voltage applied to the piezoelectric elements 23 is not limited to the voltage of push-up/pull-down type as described above, but may be a voltage of pull-down/push-up type which falls from the first voltage to the second voltage that is lower than the first voltage and then rises to the first voltage.

The application of the driving voltage to each piezoelectric element 23 is performed at a predetermined time interval (for example, about 50 µm: driving frequency=20 kHz) while the inkjet head 1 and the carriage 31 are moved from one edge to the other edge of the recording paper 41 at a generally uniform speed along the primary scanning direction. It should be noted, however, that the voltage is not applied when the inkjet head 1 resides above a portion of the recording paper 41 where an ink drop is not to be placed. In this way, an ink drop is placed at a predetermined position. After recording of one scanning cycle is completed, the recording paper 41 is transferred for a predetermined distance along the secondary scanning direction by the transfer motor and the transfer rollers 42. Then, ink drops are ejected again while the inkjet head 1 and the carriage 31 are moved along the primary scanning direction, whereby recording of another one scanning cycle is performed. This operation is repeated until a desired image is formed over the recording paper 41.

Next, the ink used in the recording apparatus A is described in detail in embodiments 1 and 2 below.

Embodiment 1

The ink of embodiment 1 contains a solvent which includes a humectant, a penetrant and water, a colorant, and a hydrolyzable silane compound employed as a water-soluble substance that is condensation-polymerized in the absence of the water. The humectant suppresses drying of the ink in the nozzle 14 of the inkjet head 1 or the like. The penetrant enhances the permeability of the ink (solvent) into the recording paper 41.

When an ink drop ejected from the nozzle 14 of the inkjet head 1 is adhered onto the recording paper 41, and water (solvent) contained in the ink drop evaporates or permeates into the recording paper 41, the silane compound is condensation-polymerized on the recording paper 41 to enclose a colorant. As a result, even when an image formed by the ink drop on the recording paper 41 is exposed to water, the colorant is prevented from exuding into the water. In this way, the silane compound improves the water-resistivity of the image. A preferable silane compound is a reaction product of hydrolysis of alkoxysilane containing an organic group that has an amino group and alkoxysilane not containing an amino group. Another preferable silane compound is an organic silicon compound obtained by hydrolysis of a hydrolyzable silane that is produced by reacting an organic monoepoxy compound with a hydrolyzable silane having an amino group and a hydrolyzable silane not containing a nitrogen atom.

The colorant is desirably a dye or a pigment. The dye may be any type of dye but is preferably a water-soluble acid dye or direct dye.

Preferable pigments are shown below. For example, preferable black pigments include carbon black whose surface is treated with a diazonium salt and carbon black whose surface is treated by graft polymerization of a polymer. Preferable color pigments include a pigment treated with a surface active agent, such as a formalin condensation product of naphthalene sulfonate, lignin sulfonic acid, dioctylsulfosuccinate, polyoxyethylene alkylamine, aliphatic acid ester, or the like. Specific examples of color pigments are shown below. Examples of preferable cyan pigments include Pigment Blue 15:3, Pigment Blue 15:4, and aluminum phthalocyanine. Examples of preferable magenta pigments include Pigment Red 122 and Pigment Violet 19. Examples of preferable yellow pigments include Pigment Yellow 74, Pigment Yellow 109, Pigment Yellow 110, and Pigment Yellow 128.

The humectant is desirably a polyhydric alcohol, such as glycerol, or the like, or a water-soluble nitrogen heterocyclic compound, such as 2-pyrrolidone, and N-methyl-2-pyrrolidone.

The penetrant is preferably monoalkylether of polyhydric alcohol, such as diethyleneglycol monobutylether, or the like.

In embodiment 1, the surface tension of the ink at 25° C. before the silane compound is condensation-polymerized (i.e., before the ink is adhered onto the recording paper 41) is set to 20–50 mN/m. The surface tension of the ink may be set only by adjusting the content of the penetrant with respect to the total amount of the ink. The content of the penetrant is preferably 1–50% by mass with respect to the total amount of the ink. This is because if the content of the penetrant is smaller than 1%, the surface tension of the ink cannot be 50 mN/m or smaller. On the other hand, if the content of the penetrant is greater than 50%, the solubility of the colorant and the silane compound to the solvent decreases.

The surface tension of the solvent in which a colorant and a silane compound are not dissolved may be set to 20–50 mN/m. In the case where ink is produced by dissolving the colorant and the silane compound into the solvent having such a surface tension, the surface tension of the ink results in about 20–50 mN/m.

In some cases, ink having a low surface tension, e.g., about 20 mN/m, cannot be realized only by adding a penetrant. In such cases, a fluoric surface active agent may be added as an assisting agent for the penetrant. The fluoric surface active agent is preferably an ammonium salt of perfluoro alkylsulfon acid, a potassium salt of perfluoro alkylsulfon acid, a potassium salt of perfluoro alkylcarbon acid, or the like.

Thus, according to embodiment 1, ink for inkjet recording contains a solvent which includes a humectant, a penetrant and water, a colorant, and a hydrolyzable silane compound employed as a water-soluble substance that is condensation-polymerized in the absence of water. Furthermore, the surface tension of the ink is set to a relatively low value of 20–50 mN/m. In the case where the ink is used to form an image on the recording paper 41 with the recording apparatus A, after a drop of the ink is adhered onto the recording paper 41, the solvent of the ink drop quickly permeates into the recording paper 41. Accordingly, the silane compound is quickly condensation-polymerized, and the condensation-polymerized silane compound quickly and securely encloses the colorant. As a result, highly-improved water-resistivity can be realized even immediately after the formation of the image.

The surface tension of the ink is preferably set to be as low as possible in view of quick permeation of the solvent into the recording paper 41. However, if the surface tension of the ink is smaller than 20 mN/m, it is difficult to make the ink into the form of a droplet when the ink is ejected from the nozzle 14, and such ink is not desirable for inkjet recording. Therefore, the surface tension of the ink should be set to 20 mN/m or greater.

Preferably, the viscosity of the ink at 25° C. before the silane compound is condensation-polymerized is set to 2–10 cP. This is because if the viscosity of the ink is set to a relatively small value, e.g., 10 cP or smaller, the solvent permeates into the recording paper 41 more quickly. The viscosity of the ink is preferably set to be as low as possible in view of quick permeation of the solvent into the recording paper 41. However, considering that the viscosity of water is about 1 cP, the lower limit of the viscosity of the ink containing a colorant, a humectant, a penetrant and a silane compound is 2 cP.

In the case where the piezoelectric element 23 of the piezoelectric actuator 21 has a thickness of 8 μm or smaller (e.g., about 3 μm) as explained above for the recording apparatus A, the surface tension of the ink at 25° C. before the silane compound is condensation-polymerized is preferably set to 30–40 mN/m. For example, in the case where the piezoelectric element 23 is replaced by a piezoelectric element having a thickness of, for example, 10 μm or greater, the pull-back force of the piezoelectric actuator 21 which is caused by the piezoelectric element having this thickness (i.e., the force caused when the piezoelectric actuator 21 restores its original shape) is relatively large. Thus, even if the surface tension of the ink is relatively low, e.g., about 20 mN/m, a portion of the ink ejected out of the nozzle 14 is separated to form an ink drop. If the thickness of the thin-film piezoelectric element 23 is 8 μm or smaller, the pull-back force of the piezoelectric actuator 21 which is caused by the thin-film piezoelectric element 23 is small. Thus, if the surface tension of the ink is smaller than 30 mN/m, a portion of the ink ejected out of the nozzle 14 cannot be separated, and an ink drop (especially, a small ink drop of 3 pl or smaller) cannot be formed. However, when the surface tension of the ink is set to 30 mN/m or greater, an ink drop is surely formed and ejected even if a piezoelectric element is a thin film.

As previously described, when the piezoelectric actuator 21 recovers its original shape, the pressure chamber 4 is charged with the ink supplied from the ink cartridge 35 through the ink supply passage 11 and the supply hole 3a. Considering that the pull-back force of the piezoelectric actuator 21 is small when the thickness of the piezoelectric element 23 is small as explained above, it is difficult to smoothly supply the ink into the pressure chamber 4 when the surface tension of the ink is too high. However, in the case where the surface tension of the ink is set to 40 mN/m or smaller, the ink is smoothly supplied into the pressure chamber 4. As a result, the time interval between a time of ejecting an ink drop and a time of ejecting a next ink drop can be shortened, and the driving frequency of the piezoelectric actuator 21 results in 20 kHz or higher.

In embodiment 1, a hydrolytic silane compound is contained in the ink as the water-soluble substance that is condensation-polymerized in the absence of water, but the present invention is not limited thereto. Any type of substance may be used so long as the substance is condensation-polymerized to enclose a colorant when a water content (solvent) of an ink drop which is ejected from the nozzle 14 of the inkjet head 1 and adhered onto the recording paper 41 evaporates or permeates into the recording paper 41.

Now, specific examples of the ink of embodiment 1 are described.

First, 16 types of ink for inkjet recording, which have the following compositions, were prepared (Examples 1–16). (It should be noted that the contents of the constituents of each composition are shown in percentage by mass.)

In all of Examples 1–16, glycerol is used as the humectant, and diethyleneglycol monobutylether is used as the penetrant. Further, an organic silicon compound is used as the water-soluble substance that is condensation-polymerized in the absence of water. An organic silicon compound used in Examples 1–3 and 9–16 (hereinafter, referred to as "organic silicon compound (A)) is different from that used in Examples 4–8 (hereinafter, referred to as "organic silicon compound (B)). Organic silicon compounds (A) and (B) were respectively prepared by the methods described below.

Organic silicon compound (A) was obtained as follows. A mixture of 100 g (0.56 mol) of $H_2NCH_2CH_2CH_2Si(OCH_3)_3$ and 166 g (1.1 mol) of $Si(OCH_3)_4$ was added to 180 g (10 mol) of water contained in a reactor in a drop-by-drop fashion at room temperature. After all of the mixture was dropped into the water, the resultant solution was stirred for one hour at 60° C., whereby organic silicon compound (A) was obtained.

Organic silicon compound (B) was obtained as follows. First, 49 g (0.66 mol) of 2,3-epoxy-1-propanol was added to 100 g (0.56 mol) of $H_2NCH_2CH_2CH_2Si(OCH_3)_3$ contained in a reactor in a drop-by-drop fashion. After all of 2,3-epoxy-1-propanol was dropped, the resultant mixture in the reactor was stirred for 5 hours at 80° C., whereby hydrolytic silane which was a reaction product of an amino group and an epoxy group was obtained. Then, a mixture of 120 g (6.67 mol) of water, 50.6 g (0.2 mol) of the obtained hydrolytic silane and 30.4 g (0.2 mol) of $Si(OCH_3)_4$ was supplied into a new reactor in a drop-by-drop fashion. After all of the mixture was dropped, the mixture in the reactor was subjected to a reaction for one hour at 60° C., whereby organic silicon compound (B) was obtained.

As the colorant, a dye was used in Examples 1–11, whereas a pigment was used in Examples 12–16. As the dye, C.I. acid black 2 was used except that dyes of different colors were used in Examples 9–11.

(Example 1)

| | |
|---|---|
| C.I. acid black 2 | 5% |
| glycerol | 10% |
| diethyleneglycol monobutylether | 5% |
| organic silicon compound (A) | 5% |
| pure water | 75% |

(Example 2)

| | |
|---|---|
| C.I. acid black 2 | 5% |
| glycerol | 10% |
| diethyleneglycol monobutylether | 10% |
| organic silicon compound (A) | 5% |
| pure water | 70% |

(Example 3)

| | |
|---|---|
| C.I. acid black 2 | 5% |
| glycerol | 10% |
| diethyleneglycol monobutylether | 20% |
| organic silicon compound (A) | 5% |
| pure water | 60% |

(Example 4)

| | |
|---|---|
| C.I. acid black 2 | 5% |
| glycerol | 10% |
| diethyleneglycol monobutylether | 5% |
| organic silicon compound (B) | 5% |
| pure water | 75% |

(Example 5)

| | |
|---|---|
| C.I. acid black 2 | 5% |
| glycerol | 10% |
| diethyleneglycol monobutylether | 10% |
| organic silicon compound (B) | 5% |
| pure water | 70% |

(Example 6)

| | |
|---|---|
| C.I. acid black 2 | 5% |
| glycerol | 10% |
| diethyleneglycol monobutylether | 20% |
| organic silicon compound (B) | 5% |
| pure water | 60% |

(Example 7)

| | |
|---|---|
| C.I. acid black 2 | 5% |
| glycerol | 10% |
| diethyleneglycol monobutylether | 2% |
| organic silicon compound (B) | 5% |
| pure water | 78% |

(Example 8)

| | |
|---|---|
| C.I. acid black 2 | 5% |
| glycerol | 10% |
| diethyleneglycol monobutylether | 10% |
| fluoric surface active agent | 1% |
| (product name: FC-93; produced by 3M Co.) | |
| organic silicon compound (B) | 5% |
| pure water | 69% |

(Example 9)

| | |
|---|---|
| C.I. acid yellow 23 | 5% |
| glycerol | 10% |
| diethyleneglycol monobutylether | 5% |
| organic silicon compound (A) | 5% |
| pure water | 75% |

(Example 10)

| | |
|---|---|
| C.I. acid red 52 | 5% |
| glycerol | 10% |
| diethyleneglycol monobutylether | 5% |
| organic silicon compound (A) | 5% |
| pure water | 75% |

(Example 11)

| | |
|---|---|
| C.I. direct blue 86 | 5% |
| glycerol | 10% |
| diethyleneglycol monobutylether | 5% |
| organic silicon compound (A) | 5% |
| pure water | 75% |

(Example 12)

| | |
|---|---|
| carbon black | 5% |
| (product name: CAB-O-JETTM-200; produced by Cabot Co.) | |
| glycerol | 10% |
| diethyleneglycol monobutylether | 10% |
| organic silicon compound (A) | 5% |
| pure water | 70% |

(Example 13)

| | |
|---|---|
| carbon black | 5% |
| (product name: CAB-O-JETTM-300; Produced by Cabot Co.) | |
| glycerol | 10% |
| diethyleneglycol monobutylether | 10% |
| organic silicon compound (A) | 5% |
| pure water | 70% |

(Example 14)

| | |
|---|---|
| yellow pigment | 5% |
| (product name: FUJI SP YELLOW 4223; produced by FUJI SHIKISO Co.) | |
| glycerol | 10% |
| diethyleneglycol monobutylether | 10% |
| organic silicon compound (A) | 5% |
| pure water | 70% |

(Example 15)

| | |
|---|---|
| magenta pigment | 5% |
| (product name: FUJI SP MAGENTA 9338; produced by FUJI SHIKISO Co.) | |
| glycerol | 10% |
| diethyleneglycol monobutylether | 10% |
| organic silicon compound (A) | 5% |
| pure water | 70% |

(Example 16)

| | |
|---|---|
| cyan pigment | 5% |
| (product name: FUJI SP BLUE 6403; produced by FUJI SHIKISO Co.) | |
| glycerol | 10% |
| diethyleneglycol monobutylether | 10% |
| organic silicon compound (A) | 5% |
| pure water | 70% |

For comparison, 2 types of ink having the following compositions were prepared (Comparative Examples 1 and 2). (It should be noted that the contents of the constituents of each composition are shown in percentage by mass.) None of the ink compositions of Comparative Examples 1 and 2 contains a penetrant. The organic silicon compound used in Comparative Example 1 is organic silicon compound (A), whereas the organic silicon compound used in Comparative Example 2 is organic silicon compound (B).

| (Comparative Example 1) | |
|---|---|
| C.I. acid black 2 | 5% |
| glycerol | 10% |
| organic silicon compound (A) | 5% |
| pure water | 80% |
| (Comparative Example 2) | |
| C.I. acid black 2 | 5% |
| glycerol | 35% |
| organic silicon compound (B) | 5% |
| pure water | 55% |

For each of the ink of Examples 1–16 and Comparative Examples 1 and 2, the surface tension of the solvent not yet containing a colorant or an organic silicon compound was measured at 25° C., and after ink was prepared by dissolving the colorant and the organic silicon compound therein, the surface tension of the ink (the ink surface tension at 25° C. before the organic silicon compound is condensation-polymerized) was measured. Measurement results are shown in Table 1.

TABLE 1

| | Surface tension (ink) (mN/m, 25° C.) | Viscosity (ink) (cP/25° C.) | Surface tension (solvent) (mN/m, 25° C.) |
|---|---|---|---|
| Example 1 | 40 | 2.5 | 42 |
| Example 2 | 34 | 3.5 | 36 |
| Example 3 | 31 | 5.1 | 33 |
| Example 4 | 39 | 2.7 | 41 |
| Example 5 | 33 | 3.6 | 35 |
| Example 6 | 30 | 5.2 | 32 |
| Example 7 | 48 | 2.3 | 50 |
| Example 8 | 22 | 2.8 | 24 |
| Example 9 | 38 | 2.6 | 40 |
| Example 10 | 39 | 2.5 | 41 |
| Example 11 | 37 | 2.6 | 39 |
| Example 12 | 34 | 3.1 | 36 |
| Example 13 | 33 | 3.2 | 36 |
| Example 14 | 34 | 3.2 | 36 |
| Example 15 | 32 | 3.3 | 36 |
| Example 16 | 33 | 3.2 | 36 |
| Comparative Example 1 | 64 | 2.1 | 66 |
| Comparative Example 2 | 62 | 14 | 64 |

As seen from Table 1, the surface tension of the ink is in the range of 20–50 mN/m for all of Examples 1–16. Especially, the surface tension of the ink is in the range of 30–40 mN/m except for Examples 7 and 8. Also for the solvents of the ink of Example 1–16, the surface tension of each solvent is in the range of 20–50 mN/m (which is substantially the same as the surface tension of the ink). Furthermore, in all of the ink of Examples 1–16, the viscosity is in the range of 2–10 cP.

On the other hand, in Comparative Examples 1 and 2, the surface tension of the ink is greater than 50 mN/m, and the surface tension of the solvent is also greater than 50 mN/m. In Comparative Example 1, the viscosity of the ink is in the range of 2–10 cP, whereas in Comparative Example 2 the viscosity of the ink is greater than 10 cP. Note that both the surface tension and the viscosity are appropriately low in Example 2, and in this case, excellent ejectability of ink can be obtained in the inkjet head 1 (the thickness of the piezoelectric element 23 is 8 μm or smaller).

Each of the ink of Examples 1–16 and Comparative Examples 1 and 2 was used to form an image on plain paper (product name: Xerox4024; produced by Xerox Co.) with a commercially-available printer (which ejects ink using a piezoelectric actuator similar to that used in the recording apparatus A (except that the thickness of the piezoelectric element used herein is considerably greater than that of the recording apparatus A)). The paper on which the image was formed was soaked in pure water immediately after the formation of the image and then dried at room temperature to examine whether or not a bleeding was generated in the image.

As a result, in the image formed with each of the ink of Comparative Examples 1 and 2, a bleeding was found at an edge portion of the image. On the other hand, no bleeding was found in the image formed with each ink of Examples 1–16. It is understood that high-level water-resistivity can be obtained even immediately after the formation of the image by setting the surface tension of the ink or solvent to 20–50 mN/m. It is estimated that high water-resistivity is achieved immediately after the formation of the image with more certainty by setting the viscosity of the ink to 2–10 cP in addition to the setting of the surface tension of the ink (solvent) to 20–50 mN/m. However, when the surface tension of the ink or solvent is greater than 50 mN/m as in Comparative Example 1, the water-resistivity obtained immediately after the formation of the image is low even if the viscosity of the ink is 2–10 cP. Therefore, it is understood that the surface tension of the ink or solvent is a very important factor for improving the water-resistivity of the image, in other words, for achieving quick permeation of the solvent into the recording paper 41.

Embodiment 2

The ink of embodiment 2 contains, as in embodiment 1, a colorant, a humectant for suppressing drying of the ink in the nozzle 14 of the inkjet head 1, or the like, a penetrant for improving the permeability of the ink (solvent) into the recording paper 41, water, and a hydrolyzable silane compound employed as a water-soluble material that is condensation-polymerized in the absence of the water. Embodiment 2 is characterized in that the ink contains, in addition to the above constituents, a fluoroalkyl monoalcohol whose boiling point is lower than 100° C.

Specific examples of the colorant, the humectant, the penetrant and the silane compound employed in embodiment 2 are the same as those shown in embodiment 1. In embodiment 2, it is not necessary to set the surface tension of the ink within the range of 20–50 mN/m as in embodiment 1. However, as a matter of course, it is preferable to set the surface tension of the ink within such a range. Furthermore, it is preferable to set the content of the penetrant to 1–50% by mass with respect to the total amount of the ink.

The fluoroalkyl monoalcohol diffuses molecules of water in the ink at a level which corresponds to the content of the fluoroalkyl monoalcohol. As a result, when an ink drop is adhered onto the recording paper 41, evaporation of water contained in the ink drop and permeation of the water into the recording paper 41 are achieved more quickly. Specific examples of the fluoroalkyl monoalcohol include following compounds (1) to (26) (which are shown by chemical formulae 1–26).

(1) 2,2,2-trifluoroethanol
(boiling point: 47° C.)

Chemical Formula 1

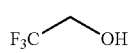

(2) 3,3,3-trifluoropropane-1-ol
(boiling point: 72.6° C.)

Chemical Formula 2

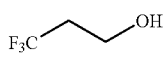

(3) 2,2,3,3,3-pentafluoropropane-1-ol
(boiling point: 52.1° C.)

Chemical Formula 3

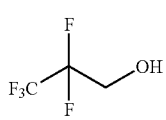

(4) 4,4,4-trifluorobutan-1-ol
(boiling point: 97.1° C.)

Chemical Formula 4

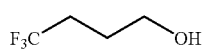

(5) 3,3,4,4,4-pentafluorobutan-1-ol
(boiling point: 77.5° C.)

Chemical Formula 5

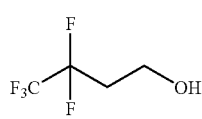

(6) 2,2,3,3,4,4,4-heptafluorobutan-1-ol
(boiling point: 57.2° C.)

Chemical Formula 6

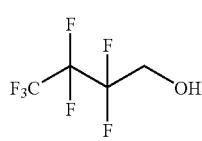

(7) 3,3,4,4,5,5,5-heptafluoropentane-1-ol
(boiling point: 82.3° C.)

Chemical Formula 7

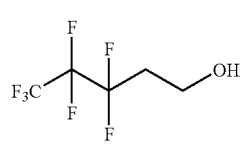

(8) 2,2,3,3,4,4,5,5,5-nonafluoropentan-1-ol
(boiling point: 62.2° C.)

Chemical Formula 8

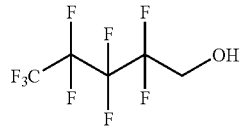

(9) 3,3,4,4,5,5,6,6,6-nonafluorohexane-1-ol
(boiling point: 87.2° C.)

Chemical Formula 9

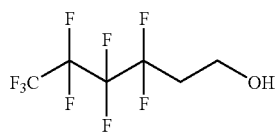

(10) 2,2,3,3,4,4,5,5,6,6,6-undecafluorohexane-1-ol
(boiling point: 67.2° C.)

Chemical Formula 10

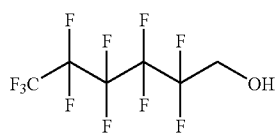

(11) 1,1,2,2,3,3,4,4,5,5,6,6,6-tridecafluorohexane-1-ol
(boiling point: 25.8° C.)

Chemical Formula 11

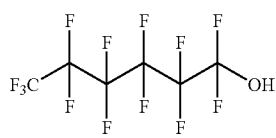

(12) 3,3,4,4,5,5,6,6,7,7,7-undecafluoroheptane-1-ol
(boiling point: 91.2° C.)

Chemical Formula 12

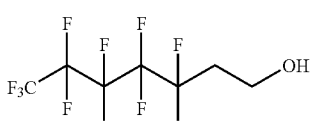

(13) 2,2,3,3,4,4,5,5,6,6,7,7,7-tridecafluoroheptane-1-ol
(boiling point: 72.1° C.)

Chemical Formula 13

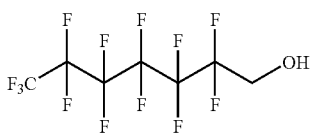

(14) 1,1,2,2,3,3,4,4,5,5,6,6,7,7,7-pentadecafluoroheptane-1-ol (boiling point: 30.9° C.)

Chemical Formula 14

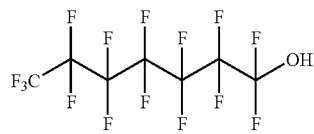

(15) 3,3,4,4,5,5,6,6,7,7,8,8,8-tridecafluorooctane-1-ol (boiling point: 96.7° C.)

Chemical Formula 15

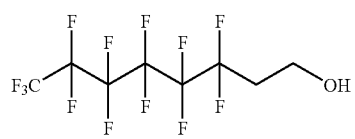

(16) 2,2,3,3,4,4,5,5,6,6,7,7,8,8,8-pentadecafluorooctane-1-ol (boiling point: 77° C.)

Chemical Formula 16

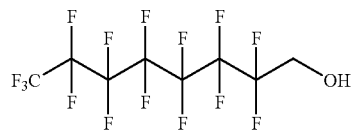

(17) 1,1,2,2,3,3,4,4,5,5,6,6,7,7,8,8,8-heptadecafluorooctane-1-ol (boiling point: 36.2° C.)

Chemical Formula 17

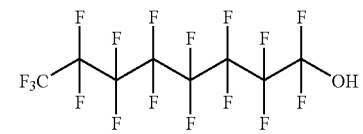

(18) 2,2,3,3,4,4,5,5,6,6,7,7,8,8,9,9,9-heptadecafluorononane-1-ol (boiling point: 81.9° C.)

Chemical Formula 18

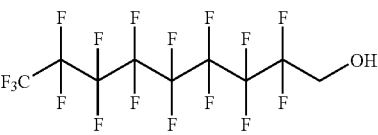

(19) 1,1,2,2,3,3,4,4,5,5,6,6,7,7,8,8,9,9,9-nonadecafluorononane-1-ol (boiling point: 41.4° C.)

Chemical Formula 19

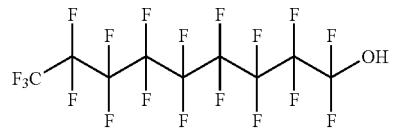

(20) 2,2,3,3,4,4,5,5,6,6,7,7,8,8,9,9,10,10,10-nonadecafluorodecane-1-ol (boiling point: 86.7° C.)

Chemical Formula 20

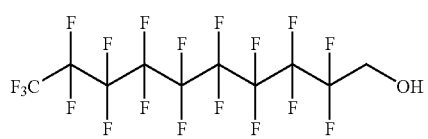

(21) 1,1,2,2,3,3,4,4,5,5,6,6,7,7,8,8,9,9,10,10,10-heneicosafluorodecane-1-ol (boiling point: 46.5° C.)

Chemical Formula 21

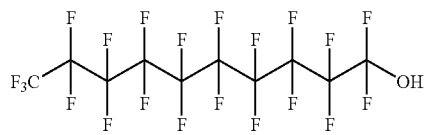

(22) 2,2,3,3,4,4,5,5,6,6,7,7,8,8,9,9,10,10,11,11,11-heneicosafluoroundecane-1-ol (boiling point: 91.5° C.)

Chemical Formula 22

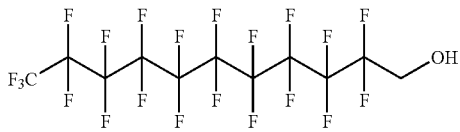

(23) 1,1,2,2,3,3,4,4,5,5,6,6,7,7,8,8,9,9,10,10,11,11,11-tricosafluoroundecane-1-ol (boiling point: 51.6° C.)

Chemical Formula 23

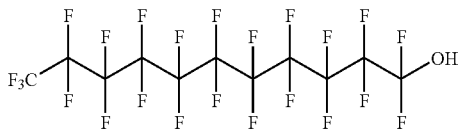

(24) 2,2,3,3,4,4,5,5,6,6,7,7,8,8,9,9,10,10,11,11,12,12,12-tricosafluorododecane-1-ol
(boiling point: 96.3° C.)

Chemical Formula 24

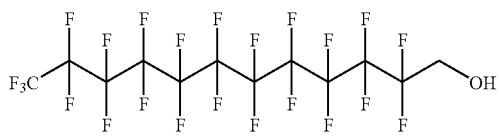

(25) 1,1,2,2,3,3,4,4,5,5,6,6,7,7,8,8,9,9,10,10,11,11,12,12,12-pentacosafluorododecane-1-ol
(boiling point: 56.6° C.)

Chemical Formula 25

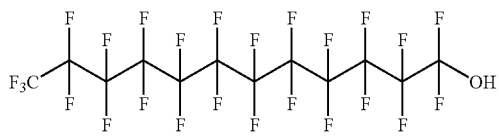

(26) 1,1,2,2,3,3,4,4,5,5,6,6,7,7,8,8,9,9,10,10,11,11,12,12,13,13,13-heptacosafluorotridecane-1-ol (boiling point: 61.6° C.)

Chemical Formula 26

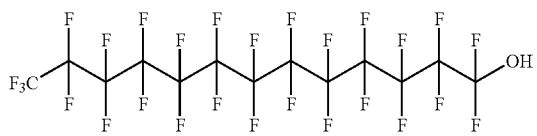

Basically, the boiling point of the fluoroalkyl monoalcohol only needs to be lower than the boiling point of water (100° C.). However, considering that the fluoroalkyl monoalcohol should evaporate faster than water from an ink drop adhered onto the recording paper 41, the boiling point of the fluoroalkyl monoalcohol is desirably 80° C. or lower. Further, considering that the fluoroalkyl monoalcohol should not evaporate while it is conserved at room temperature, the boiling point of the fluoroalkyl monoalcohol is desirably 25° C. or higher. (It should be noted that the boiling points of the fluoroalkyl monoalcohols of chemical formulae 1–26 are all within the range of 25–80° C.). A more desirable lower limit of the boiling point of the fluoroalkyl monoalcohol is 40° C.

The content of the fluoroalkyl monoalcohol is desirably set to 5–50% by mass with respect to the total amount of the ink. This is because if the content of the fluoroalkyl monoalcohol is smaller than 5%, an effect of allowing water in an ink drop adhered onto the recording paper 41 to quickly evaporate and an effect of allowing the water in the ink drop to quickly permeate into the recording paper 41 cannot be sufficiently obtained. On the other hand, if the content of the fluoroalkyl monoalcohol is greater than 50%, the ink dries more readily even when a humectant is contained in the ink, and the nozzles 14 of the inkjet head 1 of the recording apparatus A, or the like, are clogged. A more preferable range of the content of the fluoroalkyl monoalcohol is 10–30% by mass with respect to the total amount of the ink.

According to embodiment 2, ink for inkjet recording contains a colorant, a humectant, a penetrant, water, a hydrolyzable silane compound employed as a water-soluble substance that is condensation-polymerized in the absence of the water, and a fluoroalkyl monoalcohol whose boiling point is lower than 100° C. In this ink, molecules of water are diffused at a level which corresponds to the content of the fluoroalkyl monoalcohol. As a result, when an ink drop is adhered onto the recording paper 41, evaporation of water contained in the ink drop and permeation of the water into the recording paper 41 are achieved more quickly. Furthermore, since the surface tension of the ink is decreased because of the fluoroalkyl monoalcohol contained in the ink, water and the fluoroalkyl monoalcohol permeate into the recording paper 41 more readily. On the other hand, since the boiling point of the fluoroalkyl monoalcohol is lower than that of water, the fluoroalkyl monoalcohol evaporates faster than water and evaporates even after it permeates into the recording paper 41. Thus, the fluoroalkyl monoalcohol does not inhibit the condensation-polymerization of the silane compound. As a result, when an ink drop is adhered onto the recording paper 41, the condensation-polymerization of the silane compound progresses appropriately and smoothly so that the silane compound surely encloses a colorant. Thus, the water-resistivity of an image formed on the recording paper 41 can be improved as described in embodiment 1.

Also in embodiment 2, the water-soluble substance that is condensation-polymerized in the absence of water is not limited to a hydrolyzable silane compound. Any type of substance may be used so long as the substance is condensation-polymerized to enclose a colorant when a water content (solvent) of an ink drop which is ejected from the nozzle 14 of the inkjet head 1 and adhered onto the recording paper 41 evaporates or permeates into the recording paper 41.

Now, specific examples of the ink of embodiment 2 are described.

First, 26 types of ink for inkjet recording, which have the following compositions, were prepared (Examples 1–26). (It should be noted that the contents of the constituents of each composition are shown in percentage by mass.)

In all of Examples 1–26, glycerol is used as the humectant, and diethyleneglycol monobutylether is used as the penetrant. Further, an organic silicon compound is used as the hydrolyzable silane compound. The organic silicon compound used in Examples 1–15 and 22–26 is organic silicon compound (A), whereas the organic silicon compound used in Examples 16–21 is organic silicon compound (B). Organic silicon compounds (A) and (B) are the same as those described in the examples of embodiment 1.

As the fluoroalkyl monoalcohol whose boiling point is lower than 100° C., the 16 types of compounds represented by chemical formulae 1–8 and 10–17 shown above were employed. In Examples 10–12, the compound represented by chemical formula 1 is contained in different amounts.

Further, a dye is contained as the colorant in each of Examples 1–21, whereas a pigment is contained as the colorant in each of Examples 22–26. In each of Examples 22–26, the compound represented by chemical formula 2 is contained as the fluoroalkyl monoalcohol.

(Example 1)

| | |
|---|---|
| C.I. acid black 2 | 5% |
| 3,3,3-trifluoropropane-1-ol | 25% |
| glycerol | 10% |
| diethyleneglycol monobutylether | 10% |
| organic silicon compound (A) | 5% |
| pure water | 45% |

(Example 2)

| | |
|---|---|
| C.I. acid black 2 | 5% |
| 2,2,3,3,3-pentafluoropropane-1-ol | 25% |
| glycerol | 10% |
| diethyleneglycol monobutylether | 10% |
| organic silicon compound (A) | 5% |
| pure water | 45% |

(Example 3)

| | |
|---|---|
| C.I. acid black 2 | 5% |
| 4,4,4-trifluorobutan-1-ol | 25% |
| glycerol | 10% |
| diethyleneglycol monobutylether | 10% |
| organic silicon compound (A) | 5% |
| pure water | 45% |

(Example 4)

| | |
|---|---|
| C.I. acid black 2 | 5% |
| 3,3,4,4,4-pentafluorobutan-1-ol | 25% |
| glycerol | 10% |
| diethyleneglycol monobutylether | 10% |
| organic silicon compound (A) | 5% |
| pure water | 45% |

(Example 5)

| | |
|---|---|
| C.I. acid black 2 | 5% |
| 2,2,3,3,4,4,4-heptafluorobutan-1-ol | 25% |
| glycerol | 10% |
| diethyleneglycol monobutylether | 10% |
| organic silicon compound (A) | 5% |
| pure water | 45% |

(Example 6)

| | |
|---|---|
| C.I. acid black 2 | 5% |
| 3,3,4,4,5,5,5-heptafluoropentane-1-ol | 25% |
| glycerol | 10% |
| diethyleneglycol monobutylether | 10% |
| organic silicon compound (A) | 5% |
| pure water | 45% |

(Example 7)

| | |
|---|---|
| C.I. acid black 2 | 5% |
| 2,2,3,3,4,4,5,5-nonafluoropentan-1-ol | 25% |
| glycerol | 10% |
| diethyleneglycol monobutylether | 10% |
| organic silicon compound (A) | 5% |
| pure water | 45% |

(Example 8)

| | |
|---|---|
| C.I. acid black 2 | 5% |
| 2,2,3,3,4,4,5,5,6,6,6-undecafluorohexane-1-ol | 25% |
| glycerol | 10% |
| diethyleneglycol monobutylether | 10% |
| organic silicon compound (A) | 5% |
| pure water | 45% |

(Example 9)

| | |
|---|---|
| C.I. acid black 2 | 5% |
| 1,1,2,2,3,3,4,4,5,5,6,6-tridecafluorohexane-1-ol | 25% |
| glycerol | 10% |
| diethyleneglycol monobutylether | 10% |
| organic silicon compound (A) | 5% |
| pure water | 45% |

(Example 10)

| | |
|---|---|
| C.I. acid black 2 | 5% |
| 2,2,2-trifluoroethanol | 5% |
| glycerol | 10% |
| diethyleneglycol monobutylether | 10% |
| organic silicon compound (A) | 5% |
| pure water | 65% |

(Example 11)

| | |
|---|---|
| C.I. acid black 2 | 5% |
| 2,2,2-trifluoroethanol | 25% |
| glycerol | 10% |
| diethyleneglycol monobutylether | 10% |
| organic silicon compound (A) | 5% |
| pure water | 45% |

(Example 12)

| | |
|---|---|
| C.I. acid black 2 | 5% |
| 2,2,2-trifluoroethanol | 50% |
| glycerol | 10% |
| diethyleneglycol monobutylether | 10% |
| organic silicon compound (A) | 5% |
| pure water | 20% |

(Example 13)

| | |
|---|---|
| C.I. acid yellow 23 | 5% |
| 2,2,2-trifluoroethanol | 25% |
| glycerol | 10% |
| diethyleneglycol monobutylether | 10% |
| organic silicon compound (A) | 5% |
| pure water | 45% |

(Example 14)

| | |
|---|---|
| C.I. acid red 52 | 5% |
| 2,2,2-trifluoroethanol | 25% |
| glycerol | 10% |
| diethyleneglycol monobutylether | 10% |
| organic silicon compound (A) | 5% |
| pure water | 45% |

(Example 15)

| | |
|---|---|
| C.I. direct blue 86 | 5% |
| 2,2,2-trifluoroethanol | 25% |
| glycerol | 10% |
| diethyleneglycol monobutylether | 10% |
| organic silicon compound (A) | 5% |
| pure water | 45% |

(Example 16)

| | |
|---|---|
| C.I. acid black 2 | 5% |
| 3,3,4,4,5,5,6,6,7,7,7-undecafluoroheptane-1-ol | 25% |
| glycerol | 10% |
| diethyleneglycol monobutylether | 10% |
| organic silicon compound (B) | 5% |
| pure water | 45% |

(Example 17)

| | |
|---|---|
| C.I. acid black 2 | 5% |
| 2,2,3,3,4,4,5,5,6,6,7,7,7-tridecafluoroheptane-1-ol | 25% |
| glycerol | 10% |
| diethyleneglycol monobutylether | 10% |
| organic silicon compound (B) | 5% |
| pure water | 45% |

(Example 18)

| | |
|---|---|
| C.I. acid black 2 | 5% |
| 1,1,2,2,3,3,4,4,5,5,6,6,7,7,7-pentadecafluoroheptane-1-ol | 25% |
| glycerol | 10% |
| diethyleneglycol monobutylether | 10% |
| organic silicon compound (B) | 5% |
| pure water | 45% |

(Example 19)

| | |
|---|---|
| C.I. acid black 2 | 5% |
| 3,3,4,4,5,5,6,6,7,7,8,8,8- | 25% |

-continued

| | |
|---|---|
| tridecafluorooctane-1-ol | |
| glycerol | 10% |
| diethyleneglycol monobutylether | 10% |
| organic silicon compound (B) | 5% |
| pure water | 45% |
| (Example 20) | |
| | |
| C.I. acid black 2 | 5% |
| 2,2,3,3,4,4,5,5,6,6,7,7,8,8,8-pentadecafluorooctane-1-ol | 25% |
| glycerol | 10% |
| diethyleneglycol monobutylether | 10% |
| organic silicon compound (B) | 5% |
| pure water | 45% |
| (Example 21) | |
| | |
| C.I. acid black 2 | 5% |
| 1,1,2,2,3,3,4,4,5,5,6,6,7,7,8,8-heptadecafluorooctane-1-ol | 25% |
| glycerol | 10% |
| diethyleneglycol monobutylether | 10% |
| organic silicon compound (B) | 5% |
| pure water | 45% |
| (Example 22) | |
| | |
| carbon black | 5% |
| (product name: CAB-O-JETTM-200; produced by Cabot Co.) | |
| 3,3,3-trifluoropropane-1-ol | 25% |
| glycerol | 10% |
| diethyleneglycol monobutylether | 10% |
| organic silicon compound (A) | 5% |
| pure water | 45% |
| (Example 23) | |
| | |
| carbon black | 5% |
| (product name: CAB-O-JETTM-300; produced by Cabot Co.) | |
| 3,3,3-trifluoropropane-1-ol | 25% |
| glycerol | 10% |
| diethyleneglycol monobutylether | 10% |
| organic silicon compound (A) | 5% |
| pure water | 45% |
| (Example 24) | |
| | |
| yellow pigment | 5% |
| (product name: FUJI SP YELLOW 4223; produced by FUJI SHIKISO Co.) | |
| 3,3,3-trifluoropropane-1-ol | 25% |
| glycerol | 10% |
| diethyleneglycol monobutylether | 10% |
| organic silicon compound (A) | 5% |
| pure water | 45% |
| (Example 25) | |
| | |
| magenta pigment | 5% |
| (product name: FUJI SP MAGENTA 9338; produced by FUJI SHIKISO Co.) | |
| 3,3,3-trifluoropropane-1-ol | 25% |
| glycerol | 10% |
| diethyleneglycol monobutylether | 10% |
| organic silicon compound (A) | 5% |
| pure water | 45% |
| (Example 26) | |
| | |
| cyan pigment | 5% |
| (product name: FUJI SP BLUE 6403; produced by FUJI SHIKISO Co.) | |
| 3,3,3-trifluoropropane-1-ol | 25% |
| glycerol | 10% |
| diethyleneglycol monobutylether | 10% |
| organic silicon compound (A) | 5% |
| pure water | 45% |

For comparison, 2 types of ink having the following compositions (which do not contain a fluoroalkyl monoalcohol) were prepared (Comparative Examples 1 and 2). (It should be noted that the contents of the constituents of each composition are shown in percentage by mass.)

None of the ink of Comparative Examples 1 and 2 contains a penetrant. Comparative Example 1 employed organic silicon compound (A) which was also used in Examples 1–15 and 22–26, whereas Comparative Example 2 employed organic silicon compound (B) which was also used in Examples 16–21.

| | |
|---|---|
| (Comparative Example 1) | |
| C.I. acid black 2 | 5% |
| glycerol | 10% |
| organic silicon compound (A) | 5% |
| pure water | 80% |
| (Comparative Example 2) | |
| C.I. acid black 2 | 5% |
| glycerol | 10% |
| organic silicon compound (B) | 5% |
| pure water | 80% |

Each of the ink of Examples 1–26 and Comparative Examples 1 and 2 was used to form an image on plain paper (product name: Xerox4024; produced by Xerox Co.) with a commercially-available printer (which ejects ink using a piezoelectric actuator similar to that used in the recording apparatus A (except that the thickness of the piezoelectric element used herein is considerably greater than that of the recording apparatus A)). The paper on which the image was formed was soaked in pure water and then dried at room temperature to examine whether or not a bleeding was generated in the image.

As a result, in the image formed with each of the ink of Comparative Examples 1 and 2, a bleeding was found in an edge portion of a character and a portion of a pictorial portrait image. On the other hand, no bleeding was found in the image formed with each ink of Examples 1–26. It is thus understood that high water-resistivity is obtained by addition of a fluoroalkyl monoalcohol.

INDUSTRIAL APPLICABILITY

The present invention is useful for ink for inkjet recording which is employed for recording with an inkjet-type recording apparatus. The present invention possesses high industrial applicability in respect that the water-resistivity of an image formed with the ink on a recording paper, or the like, especially the water-resistivity of the image which is obtained immediately after the formation thereof, is improved.

The invention claimed is:

1. Ink for inkjet recording, comprising a colorant, a humectant, a penetrant, water, and a water-soluble substance that is condensation-polymerized in the absence of the water,
   wherein the ink further contains a fluoroalkyl monoalcohol whose boiling point is at least 40° C. but less than or equal to 80° C. to promote said condensation polymerization for improved water-resistance, and
   the fluoroalkyl monoalcohol includes at least one of selected from the group consisting of:
   3,3,3-trifluoropropane-1-ol;
   2,2,3,3,4,4-heptafluorobutan-1-ol;
   2,2,3,3,4,4,5,5-nonafluoropentan-1-ol;
   2,2,3,3,4,4,5,5,6,6-undecafluorohexane-1-ol;
   2,2,3,3,4,4,5,5,6,6,7,7-tridecafluoroheptane-1-ol;

2,2,3,3,4,4,5,5,6,6,7,7,8,8,8-pentadecafluorooctane-1-ol;
1,1,2,2,3,3,4,4,5,5,6,6,7,7,8,8,9,9,9-nonadecafluorononane-1-ol;
1,1,2,2,3,3,4,4,5,5,6,6,7,7,8,8,9,9,10,10,10-heneicosafluorodecane-1-ol;
1,1,2,2,3,3,4,4,5,5,6,6,7,7,8,8,9,9,10,10,11,11,11-tricosafluoroundecane-1-ol;
1,1,2,2,3,3,4,4,5,5,6,6,7,7,8,8,9,9,10,10,11,11,12,12,12-pentacosafluorododecane-1-ol; and
1,1,2,2,3,3,4,4,5,5,6,6,7,7,8,8,9,9,10,10,11,11,12,12,13,13,13-heptacosafluorotridecane-1-ol.

2. Ink for inkjet recording according to claim 1, wherein the water-soluble substance is a hydrolysable silane compound.

3. Ink for inklet recording according to claim 1, wherein the content of the fluoroalkyl monoalcohol is set to 5–50% by mass with respect to the total amount of the ink.

4. A cartridge including ink for inklet recording, the ink containing a colorant, a humectant, a penetrant, water, and a water-soluble substance that is condensation-polymerized in the absence of the water,
wherein the ink further contains a fluoroalkyl monoalcohol whose boiling point is at least 40° C. but less than or equal to 80° C. to promote said condensation polymerization for improved water-resistance, and
the fluoroalkyl monoalcohol includes at least one selected from the group consisting of:
3,3,3-trifluoropropane-1-ol;
2,2,3,3,4,4,4-heptafluorobutan-1-ol;
2,2,3,3,4,4,5,5,5-nonafluoropentan-1-ol;
2,2,3,3,4,4,5,5,6,6,6-undecafluorohexane-1-ol;
2,2,3,3,4,4,5,5,6,6,7,7,7-tridecafluoroheptane-1-ol;
2,2,3,3,4,4,5,5,6,6,7,7,8,8,8-pentadecafluorooctane-1-ol;
1,1,2,2,3,3,4,4,5,5,6,6,7,7,8,8,9,9,9-nonadecafluorononane-1-ol;
1,1,2,2,3,3,4,4,5,5,6,6,7,7,8,8,9,9,10,10,10-heneicosafluorodecane-1-ol;
1,1,2,2,3,3,4,4,5,5,6,6,7,7,8,8,9,9,10,10,11,11,11-tricosafluoroundecane-1-ol;
1,1,2,2,3,3,4,4,5,5,6,6,7,7,8,8,9,9,10,10,11,11,12,12,12-pentacosafluorododecane-1-ol; and
1,1,2,2,3,3,4,4,5,5,6,6,7,7,8,8,9,9,10,10,11,11,12,12,13,13,13-heptacosafluorotridecane-1-ol.

5. A recording apparatus including ink for inkjet recording, the ink containing a colorant, a humectant, a penetrant, water, and a water-soluble substance that is condensation-polymerized in the absence of the water, and the recording apparatus ejecting the ink toward a recording medium for recording,
wherein the ink further contains a fluoroalkyl monoalcohol whose boiling point is at least 40° C. but less than or equal to 80° C. to promote said condensation polymerization for improved water-resistance, and
the fluoroalkyl monoalcohol includes at least one selected from the group consisting of:
3,3,3-trifluoropropane-1-ol;
2,2,3,3,4,4,4-heptafluorobutan-1-ol;
2,2,3,3,4,4,5,5,5-nonafluoropentan-1-ol;
2,2,3,3,4,4,5,5,6,6,6-undecafluorohexane-1-ol;
2,2,3,3,4,4,5,5,6,6,7,7,7-tridecafluoroheptane-1-ol;
2,2,3,3,4,4,5,5,6,6,7,7,8,8,8-pentadecafluorooctane-1-ol;
1,1,2,2,3,3,4,4,5,5,6,6,7,7,8,8,9,9,9-nonadecafluoronane-1-ol;
1,1,2,2,3,3,4,4,5,5,6,6,7,7,8,8,9,9,10,10,10-heneicosafluorodecane-1-ol;
1,1,2,2,3,3,4,4,5,5,6,6,7,7,8,8,9,9,10,10,11,11,11-tricosafluoroundecane-1-ol;
1,1,2,2,3,3,4,4,5,5,6,6,7,7,8,8,9,9,10.10,11,11,12,12,12-pentacosafluorododecane-1-of; and
1,1,2,2,3,3,4,4,5,5,6,6,7,7,8,8,9,9,10,10,11,11,12,12,13,13,13-heptacosafluorotridecane-1-ol.

* * * * *

UNITED STATES PATENT AND TRADEMARK OFFICE
CERTIFICATE OF CORRECTION

PATENT NO. : 7,196,121 B2
APPLICATION NO. : 10/468954
DATED : March 27, 2007
INVENTOR(S) : Mamoru Soga et al.

It is certified that error appears in the above-identified patent and that said Letters Patent is hereby corrected as shown below:

<u>Column 24</u>

Line 61, Claim 1, after "one" and before "selected", delete " of "

<u>Column 25</u>

Line 15, Claim 3, "inklet" should be -- inkjet --

Line 18, Claim 4, "inklet" should be -- inkjet --

Signed and Sealed this

Third Day of July, 2007

JON W. DUDAS
*Director of the United States Patent and Trademark Office*